Figure 1:
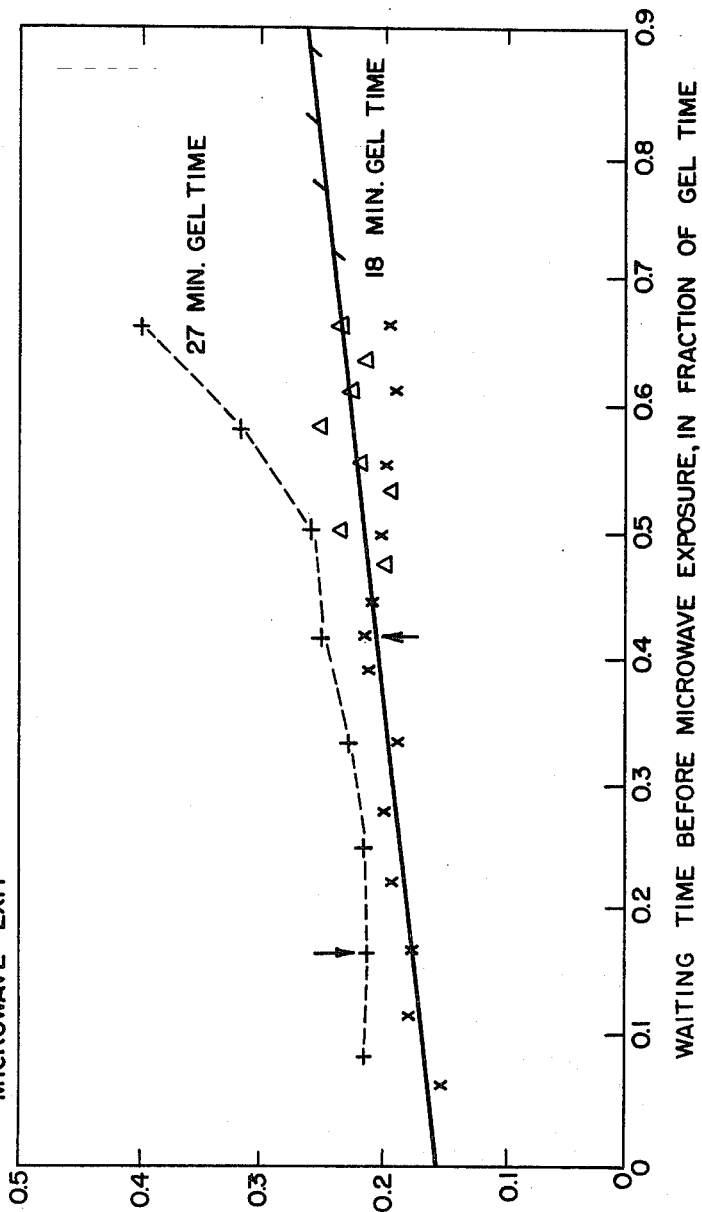

United States Patent [19]

Throne et al.

[11] 4,314,036
[45] Feb. 2, 1982

[54] UNSATURATED POLYESTER RESIN FOAMS AND PRODUCTS CONTAINING THE SAME

[75] Inventors: James L. Throne, Naperville; Richard E. Graves, Jr., Elgin, both of Ill.

[73] Assignee: Standard Oil Company (Indiana), Chicago, Ill.

[21] Appl. No.: 78,301

[22] Filed: Sep. 24, 1979

[51] Int. Cl.³ .................................................. C08J 9/00
[52] U.S. Cl. ................................. 521/99; 204/159.19; 204/159.15; 264/26; 264/45.3; 264/46.6; 264/46.7; 264/53; 521/130; 521/138; 521/915
[58] Field of Search ...................... 204/159.15, 159.19; 521/138, 99, 130, 915; 264/26

[56] References Cited

U.S. PATENT DOCUMENTS

| | | | |
|---|---|---|---|
| 3,216,849 | 11/1965 | Jacobs | 428/314 |
| 3,356,781 | 12/1967 | Sulewski et al. | 264/25 |
| 3,372,214 | 3/1968 | Marcey | 264/25 |
| 3,737,481 | 6/1973 | Vargiu et al. | 204/159.19 |
| 3,786,004 | 1/1974 | Furuya et al. | 521/138 |
| 3,816,574 | 6/1974 | Heller, Jr. et al. | 264/25 |
| 3,839,171 | 10/1974 | Akamatsu et al. | 204/159.19 |
| 3,855,160 | 12/1974 | Shiotsu et al. | 521/138 |
| 4,054,635 | 10/1977 | Schlesinger et al. | 264/22 |

OTHER PUBLICATIONS

E. N. Doyle "The Development and Uses of Polyester Products", McGraw-Hill, Inc. (1969) pp. 90-95.

Primary Examiner—Morton Foelak
Attorney, Agent, or Firm—Robert R. Cochran; William T. McClain; William H. Magidson

[57] ABSTRACT

A process for the production of foamed products from an unsaturated polyester resin composition, said composition comprising polyester resin, unsaturated monomer, a promotor, initiator, physical blowing agent, and compatible surfactant whereby a known gel time "T" results, foaming said composition by exposing it to microwave radiation prior to 1 T, thereafter permitting said foam structure to exotherm to obtain a fully cured product. Preferably the resin composition is exposed to the radiation between 0.2 and 0.7 T. Due to the foamed nature of these products, they will find many uses where insulation and light weight is important. End products include foamed unsaturated polyester resins and products incorporating the same such as patio blocks containing a polyester gel-coat, the gel-coat containing sand, decorative chips, or other decorative aggregate. The foam is a mixture of polyester resin and fillers and has a density of about 35 pounds per cubic foot. Another product is a roofing panel containing foam coated with a resin gel-coat with suitable additives for weather resistance, decorative texture, etc. The foam density is in the range of 13 pounds per cubic foot. Structural details can be added.

Another product disclosed is an architectural wall or curtain panel having a weather resistant exterior surface, an unsaturated polyester foam core, and a decorative or fire-resistant interior surface. After the foam is made, the lamination can take place as a subsequent operation.

Other products include profile shapes of the foam which can be produced by a continuous process to any desired shape such as a right angle structure.

Three dimensional shapes can also be prepared consisting solely of the polyester foam or with a coating.

5 Claims, 4 Drawing Figures

UNSATURATED POLYESTER RESIN FOAMS AND PRODUCTS CONTAINING THE SAME

THE PRIOR ART

Microwave energy has been suggested for the curing of foam materials in the past. One example of this is Jacobs U.S. Pat. No. 3,216,849 (1965). While unsaturated polyester resin is mentioned, a thorough consideration of this patent will show that the system disclosed is only applicable to the polyurethane foam which is specifically described. As shown, the foam forming materials are mixed and directed onto a belt where foaming occurs. Thereafter, the foam passes under a trowel which spreads the materials laterally at the proper depth to assure the desired thickness of the final product. Following this spreading operation, the microwave energy is applied and distributed to produce a substantially uniform rise and cure of the foam forming materials upon the sheet. In other words, the foaming takes place prior to exposure and the exotherm continues during the exposure to the microwave energy. With these urethanes, the initial mixing of the materials initiates the reaction resulting in a rapid increase in temperature which, in turn, causes vaporization of the foaming agent.

As will become apparent from this disclosure, the Jacobs' process is distinctly different from that disclosed herein. With the polyester system, quick energy addition is necessary to volatilize the foaming agent and to control the rate of gelling. Stated another way, Jacobs' reaction causes the foaming and the microwave source is an ancillary finishing step, while in the present process, the microwave energy causes the foaming and the material has no cellular structure prior to such exposure.

Another example of the early work is Deaton U.S. Pat. No. 3,288,894 (1966) wherein a foamed polyisocyanate material is disclosed.

Those skilled in the art will recognize that there are generic differences between unsaturated polyesters and urethanes and epoxies. In general, urethanes and epoxies are foamed by intimate mixing of equal parts of reactants, this permitting control of the reactivity by uniformity in mixing. Catalysis for the reaction is brought about either by the reactants themselves or by additives to one of the reactant streams. This differs from the polyester system in which the reactive mixture (unsaturated polyester and unsaturated monomer) must be mixed with appropriate amounts of initiator and promoter (normally in ratios of 100:1 or so) to initiate reaction. Also, differences exist in the times for gellation and exothermicity. As stated above, urethanes show rapid temperature increases upon mixing and the majority of gellation occurs at or near the time when peak exotherm is reached. Therefore, the lower boiling halogenated hydrocarbons can be used since the exothermic energy is available to vaporize the foaming agent before full gellation prevents bubble growth.

For polyesters, on the other hand, it is well known that gellation can occur at or near room temperature and that the structure is approaching full crosslinking potential by the time the peak exotherm temperature is reached. (H. V. Boenig, "Unsaturated Polyesters: Structure and Properties," Elsevier Publishing Company, 1964, page 143). As a result, a foaming agent vaporizing at or somewhat below room temperature will not be vaporized while the resin is still in a pre-gel state. By the time the vaporization energy is available to foam the resin, it has formed a strong gel and minimal (if any) foaming can take place.

E. N. Doyle in "The Development and Uses of Polyester Products" McGraw-Hill, Inc. (1969) has prophesized that foamed modular panels of unsaturated polyester foam will become industrially important. This is described in pages 90–95 of his book. No work was actually reported, but he does suggest the possibility of a process in which the resin is gelled using infrared lamps. The only blowing agents suggested are chemical foaming agents such as dinitroso compounds.

Finally, an article in "Modern Plastics" for June 1978 states that it was virtually impossible to foam unsaturated polyester. The reason given was that most chemical foaming agents react in very narrow temperature ranges and in polyester systems have a tendency to decompose either too soon or too late. Another shortcoming is their inability to produce the resin balance of gas and free-radical generation. To overcome these problems, Lucidol suggested use of liquid azo compounds which decompose to yield nitrogen and other products capable of initiating the reaction.

For a proper understanding of this invention, gellation and gel time should be understood as the terms are used herein. A number of tests for gel time have been described in the literature.

The gel times reported herein are based upon the following test. A measured weight of resin was poured into a 250–300 milliliter polyolefin cup at room temperature. The initiator is then added using an eye dropper with the amount of initiator controlled by counting the drops. Initiator is mixed in by stirring with a spatula with care being taken to insure thorough mixing. The time for this step is usually 30 to 60 seconds. After mixing, the time is noted and constant observation of the reacting material is maintained by continuously dipping the spatula into the resin and allowing it to flow off. When the resin strings out of the pool in the cup and then no longer flows from the tip of the spatula, it is considered to be gelled and the elapsed time from the end of the mixing step is then reported as "gel time."

In working at temperatures other than room temperature, adjustment must be made for the change in gel time with a particular recipe. To demonstrate this, a mixture on a weight basis of 700 parts Aropol 7220 Resin, 300 parts Dion 6819 Resin, 25 parts Dow Corning 193 surfactant, and 1 part Cobalt 12 percent promoter was prepared. Portions of this resin were conditioned at various temperatures for 30 minutes, and thereafter 1 part per 100 parts resin of 60 percent methyl ethyl ketone peroxide in dimethyl phthalate was added and the mixture stirred for 3 minutes and the gel time determined. The following results were obtained at various initial conditioning temperatures:

| Initial Conditioning Temp., °F. | Gel Time min. | Temp. at Gel Time °F. | Peak Exotherm Temp. °F. | Peak Exotherm Time min. |
| --- | --- | --- | --- | --- |
| 41 | 19.0 | 65 | 194 | 40.0 |
| 63 | 10.8 | 72 | 294 | 28.5 |
| 71 | 7.6 | 80 | 345 | 19.5 |
| 83 | 2.0 | 84 | 340 | 11.7 |
| 98 | 1.2 | 101 | 341 | 9.6 |

An object of this invention is to provide a new method of producing foam materials from unsaturated polyester resins. A further object of this invention is to provide new foamed unsaturated polyester materials.

Further objects of this invention include the production of composite articles using the foams produced by the method disclosed, such composite articles including patio blocks, roofing panels, architectural wall or curtain panels, various profile shapes, and other articles.

Other objects and advantages of the invention will become apparent to those skilled in the art upon reading this disclosure.

SUMMARY OF THE INVENTION

Broadly, the invention relates to a process for the production of foamed products from an unsaturated polyester resin composition, said composition comprising polyester resin, unsaturated monomer, a promoter, initiator, physical blowing agent, and compatible surfactant whereby a known gel time "T" results, foaming said composition by exposing it to microwave radiation prior to 1 T, thereafter permitting said foam structure to exotherm to obtain a fully cured product. The time of exposure to the microwave energy is sufficient to volatilize the foaming agent and to accelerate crosslinking of the resin to or close to the gel condition. Preferably the initial exposure is made between 0.2 and 0.7 T.

The invention also resides in products produced according to this method. Unfilled products can be made having a density of 1 to 20 pounds, usually 8 to 15 pounds, per cubic foot while filled products usually have a density of 10 to 50 pounds per cubic foot.

In a further aspect, the invention resides in a process for the production of foam products from an unsaturated polyester resin composition, said composition comprising a polyester resin, styrene, promoter, and surfactant and having upon subsequent addition of an initiator a gel time of "T", said process comprising adding initiator and a physical blowing agent to the composition, exposing said composition to microwave radiation at a time greater than 0.2 T (preferably between 0.2 and 0.7 T) and less than 1 T whereby foaming takes place prior to gellation, thereafter permitting said foam structure to exotherm to obtain a fully cured product.

From the above, it can be seen that the basic concept of the invention can be simply stated. The microwave energy, when applied at the proper time in the reaction process, supplies uniform and intense heat to the resin system, thus allowing vaporization of the dissolved physical foaming agent. At constant microwave energy input, application of the energy too early in the process will lead to gross bubble formation and/or cell collapse prior to gellation. Application too late in the process will lead to premature gellation and an unworkable foam. Similarly, at a fixed point in the reaction process, exposure for too short a time will lead to low foaming levels and long gellation times outside the microwave unit, yielding bubble coalescence and cell collapse. If the exposure time is too long, excess foaming and gellation occur inside the microwave unit, yielding overheating, styrene vaporization and catastrophic cell wall rupture.

THE DRAWING

Figure 2:
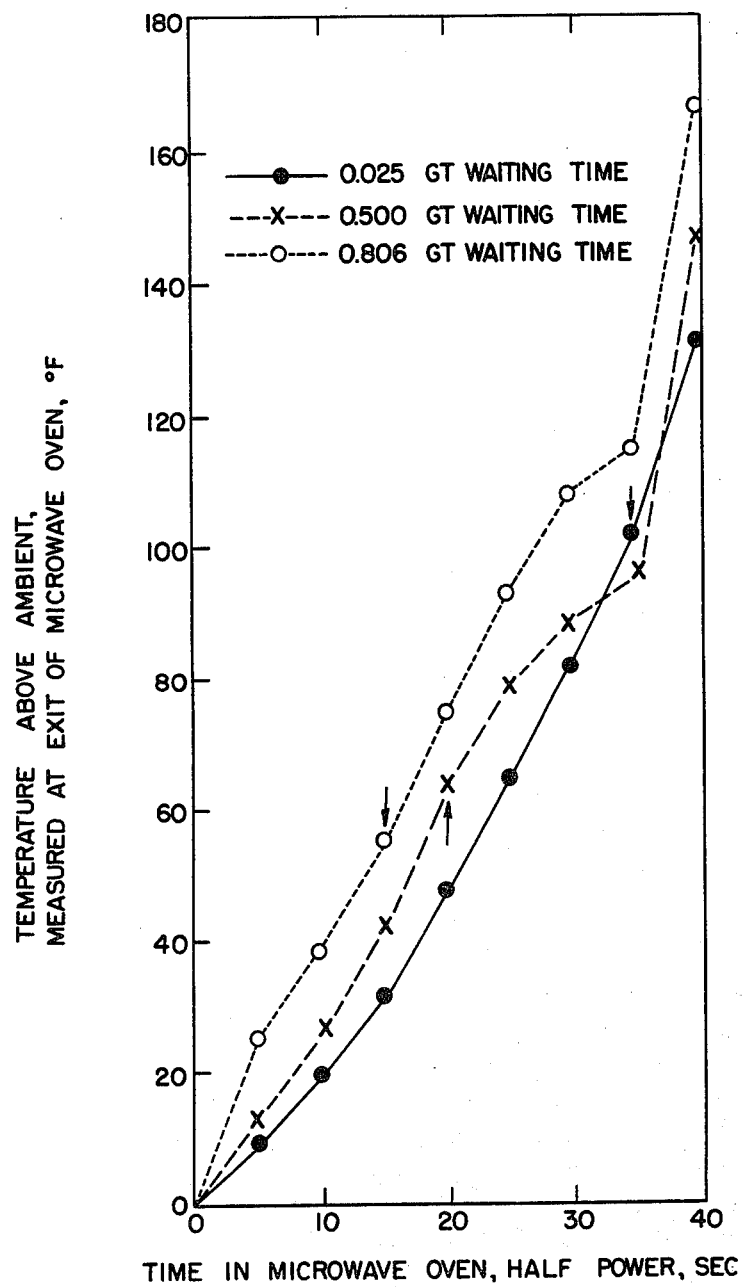
Figure 3:
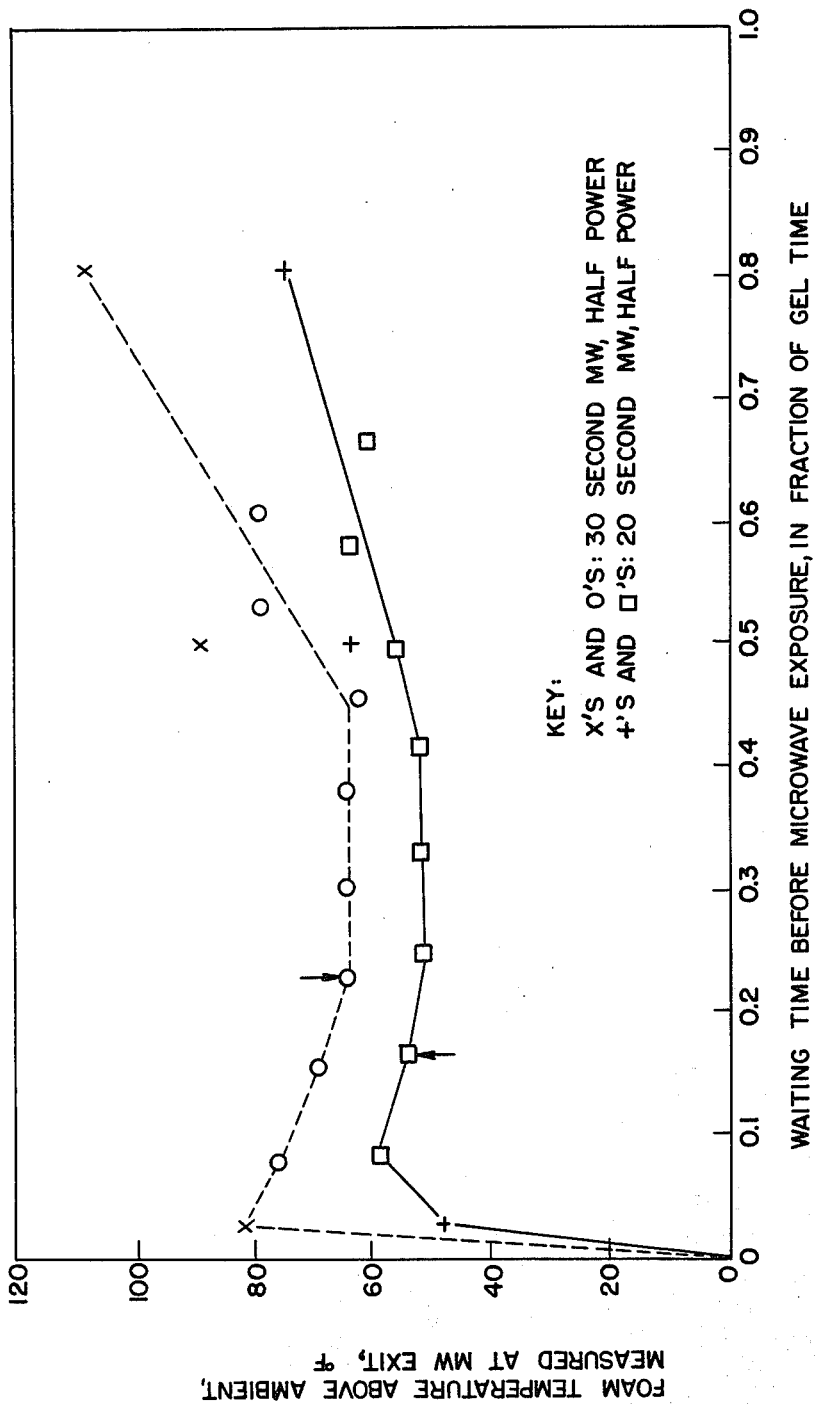
Figure 4:
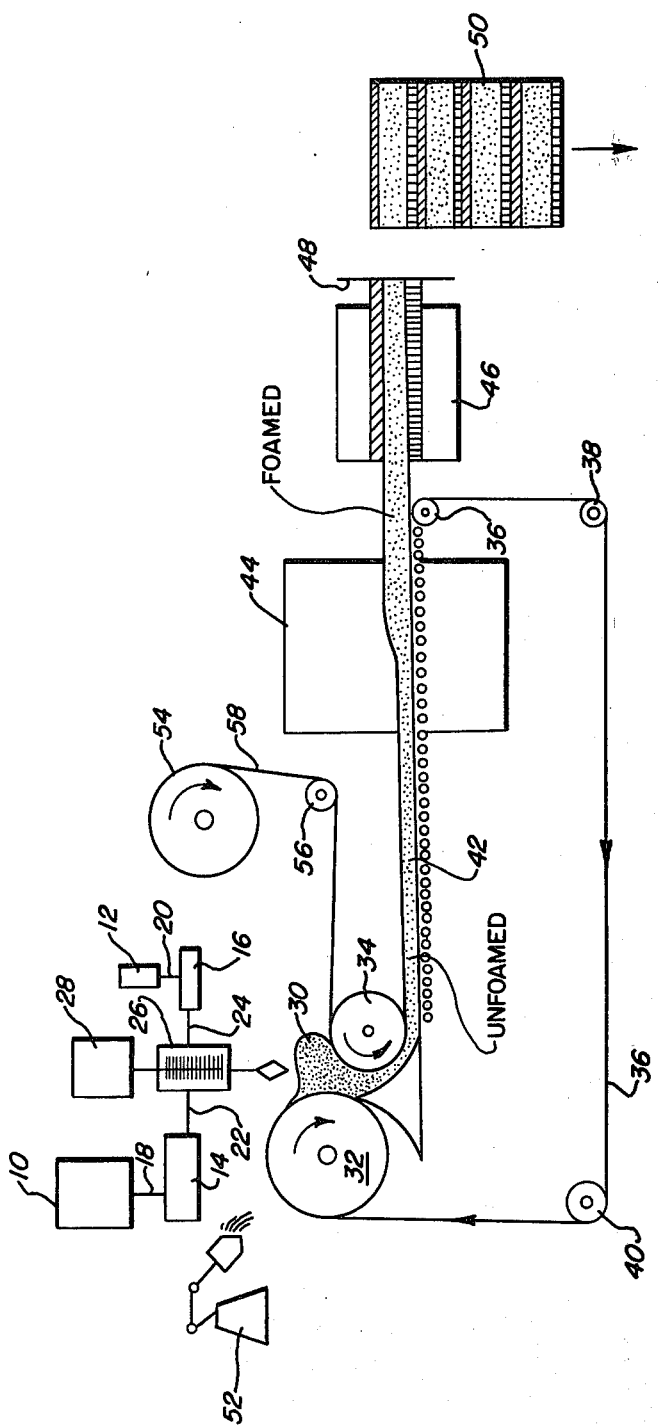

The drawing includes:

FIG. 1, curves showing the effect of waiting time before exposure to microwave energy on final foam density;

FIG. 2, curves showing the exit temperature from the microwave oven after various waiting times;

FIG. 3, curves showing the effect of waiting time on the temperature of the foam exiting the microwave oven; and FIG. 4, a schematic drawing of apparatus for practice of the invention.

GENERAL DESCRIPTION

Unsaturated polyesters are well known in the art and have been extensively studied, for details thereof, reference is made to "Unsaturated Polyesters: Structures and Properties" by Herman V. Boenig, published by Elsevier Publishing Company, Amsterdam, 1964. These unsaturated polyesters are the reaction product of one or more polycarboxylic acids and one or more polyhydric alcohols. One or more of the components of the polyester must be ethylenically unsaturated, preferably the polycarboxylic acid component. Typical unsaturated polycarboxylic acids include dicarboxylic acids and anhydrides such as fumaric acid, maleic acid, maleic anhydride, itaconic acid, citriconic acid, etc. Of these, maleic anhydride and fumaric acid are preferred. Typical saturated polycarboxylic acids include dicarboxylic acids such as phthalic acid, isophthalic acid, succinic acid, adipic acid, suberic acid, sebacic acid, azelaic acid, etc. Typical polyhydric alcohols include glycols, such as ethylene glycol, diethylene glycol, triethylene glycol, tetraethylene glycol, proplyene glycol, dipropylene glycol, and hexylene glycol; triols, such as glycerin, trimethylol ethane, trimethylol propane, and hexane triol; pentaerythritol; etc.

The ethylenically unsaturated polyester is usually a flexible polyester or a semi-rigid polyester although mixtures of these can be used with rigid polyesters. Flexible polyesters form copolymerizates with vinylidene monomers (preferably styrene) having an elastic modulus of from about 10 to about 10,000 p.s.i. while semi-rigid polyesters form copolymers having an elastic modulus of from about 10,000 to 150,000 p.s.i. In addition, rigid polyesters, which form copolymerizates having an elastic modulus of from about 150,000 to 600,000 p.s.i. can be used in addition to the flexible and semi-rigid polyesters. Generally, the non-rigid polyesters contain from about 95-50 mole percent unsaturated dicarboxylic acid and correspondingly, 5-50 mole percent alpha, beta-ethylenically unsaturated dicarboxylic acid while the polyhydroxy component is principally a glycol. Usually, the longer the chain length of the glycol or unsaturated dicarboxylic acid components making up the polyester, the more flexible the polyester. Aromatic components (which are considered saturated materials insofar as the polyesters are concerned), particularly phthalic acid, are not as effective as long-chain saturated aliphatics in lowering the elastic modulus of the copolymer. However, the low cost of phthalic acid frequently makes it a desirable component.

The ethylenically unsaturated polyesters comprise from about 30 to 80 weight percent of the polymerizable resin-forming components. The remaining 70 to 20 weight percent of the polymerizable resin-forming ingredients comprises crosslinking vinylidene monomers selected from vinyl aromatics, such as vinyl toluene, styrene, alpha-methylstyrene, divinyl benzene, dichlorostyrene, alkyl esters of alpha, beta-ethylenically unsaturated monocarboxylic acids, such as methyl methacrylate, methylacrylate, ethylacrylate and 2-ethylhexylacrylate, and vinyl esters such as vinyl acetate and propionate. The preferred vinylidene monomers are styrene and vinyl toluene. If desired, various other difunctional materials such as diallyl phthalate and triallyl cyanurate can be added to the composition.

Preoxides constitute the principal group of initiators with diacyl peroxides comprising one class and peroxy esters and ketone peroxides in the second class. The peroxides include benzoyl peroxide, 2,4-dichlorobenzoyl peroxide, lauryl peroxide, acetyl peroxide, decanoyl peroxide, propionyl peroxide, pelargonyl peroxide, bis(1-hydroxycyclohexyl)peroxide, cyclohexanone peroxide, methyl ethyl ketone peroxide, t-butylperbenzoate, di(2-ethylhexyl)peroxydicarbonate, diisopropyl peroxydicarbonate, di(secondary butyl)peroxydicarbonate, t-butylperacetate, t-butylperoxyisobutyrate, di-t-butyl diperphthalate, peroxypivalate, 2,5-dimethyl-2,5-bis(benzoylperoxy)hexane, t-butylperocylate, t-butylperoxymaleic acid, 2,5-dimethyl-2,5-bis(2-ethylhexanoylperoxy)hexane, 2,5-dimethyl-2,5-di(t-butylperoxy)hexane, 2,5-dimethyl-2,5-di(t-butylperoxy)hexyne, t-butylhydroperoxide, 2,5-dimethylhexane-2,5-dihydroperoxide, etc.

For the most part, the Lucidol series of peroxides were used, with the common ones being Lupersol Delta-X, a mixture of methyl ethyl ketone peroxide and hydroperoxides in 60% solution of dimethyl phthalate, and Lupersol 112, t-butyl perbenzoate in 67% solution of phlegmatized ketone peroxide. All examples herein report the amount of solution used and not the amount of available active oxygen present.

Suitable foaming agents useful in this invention are lower boiling hydrocarbons and halogenated derivatives thereof. Some examples are listed in the following table:

TABLE 1

| Foaming Agent | Boiling Point (1 ATM., °F.) |
| --- | --- |
| Refrigerant 11, CCl$_3$F | 74.8 |
| Refrigerant 12, CCl$_2$F$_2$ | −21.6 |
| Refrigerant 21, CHCl$_2$F | |
| Refrigerant 113, CCl$_2$F-CClF$_2$ | 117.6 |
| Refrigerant 142-B, C$_2$H$_3$ClF$_2$ | 14.5 |
| Methyl chloride | −11.2 |
| Methylene chloride | 105 |
| Chloroform | 142.2 |
| Carbon tetrachloride | 170.2 |
| Butane | 30.9 |
| Iso-butane | 69.7 |
| Pentane | 97.3 |
| Iso-pentane | 82.3 |
| Hexane | 156.2 |

In general, foaming agents and initiators should be selected so that the lower boiling foaming agents are combined with initiators active at lower temperatures. As the boiling point of the foaming agent increases, higher-temperature reactive initiators are used. Suitable combinations are shown in the Table 2:

TABLE 2

Typical Foaming Agent-Initiator Combinations

| Foaming Agent | Catalyst |
| --- | --- |
| Refrigerant 142B | 60% Methyl Ethyl Ketone Peroxide in Dimethyl Phthalate (Room Temp.) |
| Methyl Chloride | 60% Methyl Ethyl Ketone Peroxide in Dimethyl Phthalate (Room Temp.) |
| Butane | 60% Methyl Ethyl Ketone Peroxide in Dimethyl Phthalate (Room Temp.) |
| Refrigerant 12 | 60% Methyl Ethyl Ketone Peroxide in Dimethyl Phthalate (Room Temp.) |
| Iso-butane | 2,5-dimethyl-2,5 bis(benzoylperoxy)hexane (Medium Temp.) |
| Refrigerant 11 | 2,5-dimethyl-2,5 bis(benzoylperoxy)hexane (Medium Temp.) |
| Iso-pentane | 2,5-dimethyl-2,5 bis(benzoylperoxy)hexane (Medium Temp.) |
| Iso-pentane | 50% Benzyl peroxide in inert organic polasticizer (Medium Temp.) |
| Refrigerant 113 | 70% t-butyl hydroperoxide in dialkyl phthalate (High Temperature) |
| Methylene chloride | 70% t-butyl hydroperoxide in dialkyl phthalate (High Temperature) |
| Methylene chloride | 25% propionyl peroxide in high boiling hydrocarbon |
| Refrigerant 113 | 75% t-butyl diperphthalate in dibutyl phthalate (Very High Temperature) |
| Carbon tetrachloride | 75% t-butyl diperphthalate in dibutyl phthalate (Very High Temperature) |
| Chloroform | 75% t-butyl diperphthalate in dibutyl phthalate (Very High Temperature) |

Since the physical foaming agents used in this invention are substantially soluble in the resin, the products contain identifiable proportions thereof. Thus a foamed unsaturated polyester product containing the foaming agent can be identified as one produced as disclosed herein.

Various resins were used in the work reported. One was Ashland Chemical Company Aropol 7200 which is reported to be a rigid terpolymer made by polymerizing, on a weight basis, 1 part isophthalic acid, 1 part maleic anhydride, and 2.1 parts propylene glycol. Aropol 7220 is Aropol 7200 containing 35 percent by weight of styrene to give a composition having a viscosity of 3550 centipoises (as measured on a No. 6 spindle at 60 rpm on the Brookfield viscometer) at 77° F.

One series of unsaturated polyester resins produced by Koppers was used to flexibilize the rigid resin, this being Dion 6800 series which is a similar polyester except that longer chain glycols are used in place of the propylene glycol. Dion 6819, was used for most of the work, being characterized as having a viscosity of 1650–1850 centipoise (as measured on a No. 6 spindle at 60 RPM on the Brookfield viscometer) at 77° F. It contains approximately 31 percent by weight of styrene.

In some cases, Dion 6805 was added to improve flexibility, it being characterized as having a viscosity of 1100–1200 centipoise at 77° F. and as having very low ultimate tensile strength.

The above resins, when compounded, provide quite satisfactory viscosities for the foaming operation which should be at least 1,000 centipoise (as measured on a No. 6 spindle at 60 rpm on the Brookfield viscometer at 77° F.). When the viscosity falls appreciably below 1,000 centipoise, foaming upon exposure to microwave energy is quite rapid but the final foam shows severe bubble coalescence and collapse and excessive amounts of styrene evaporate if heating is continued in order to achieve a stable foam. The upper limit of viscosity for the compounded resin is limited only by the ability to get good mixing of the components. Work has been carried out where the viscosity was 8,500 centipoise and satisfactory foams were obtained.

The surfactants used are silicone-glycol based resins. Dow 200 is a dimethylpolysiloxane. Dow Corning 193 and 470-A resins are silicone-glycol copolymers as are surfactants sold under the trade designation of Air Products LK-221, LK-332, and LK-443. Soap-type surfactants such as laurates and stearates are not successful. The surfactant should be oil-based to be compatible with the polyester resin system.

In addition to the components mentioned above, the foam can contain additives such as fillers, fire retardants, colorants, UV stabilizers, reinforcing material such as glass fibers, etc. Fillers, such as sand, can be used in amounts of 1 to 5 parts by weight per part of resin.

Representative compounds useful as promoters are those which supply metal ions and include salts and acetylacetonates of potassium, cobalt, copper, vanadium, manganese and lead. These promoters should be soluble in the polyester mixture with common commercial compounds being octoates and naphthenates.

Suitable amine promoters include dimethyl aniline, diethyl anilines and dimethyl-p-toluidine. Sulfur compounds suitable as accelerators include dodecyl mercaptan and mercaptoethanol.

Based on 100 parts by weight of resin, the other ingredients can be used in the following amounts on an active ingredient weight basis:
Promoter: 0.005-1
Foaming Agent: 3-10
Initiator: 0.05-2
Surfactant: 1-10

The source of energy for the microwave forming process for the work reported herein was a 2450 megahertz (MHz) Litton 70/80 microwave oven. The oven had the capability of operating at 2,000 watts and 1,000 watts. These wattages are the nominal power of the unit—the input wattage to the unit. The actual power is the available power supplied to the cavity which is 60 to 70 percent of the nominal power. Other frequencies are available for microwave heating, representative ones being sources of 640 MHz and 915 MHz.

Mold materials which have been used are generally dielectrically transparent materials such as polypropylene and lossy dielectric materials which have a loss tangent below 0.01 such as glass, well-dried wood, fully cured glass-reinforced polyester, and china.

The general mixing procedure for unfilled resins involves adding all the desired components except for the initiator. At this stage, the composition is stable and can be stored in accordance with resin suppliers' guidelines on minimum shelf life. Once the initiator is added, foaming should take place promptly—after 0.2 gel time as set forth above.

SPECIFIC EMBODIMENTS

The following examples represent specific embodiments illustrating this invention but they should not be considered unduly limiting. For a proper investigation of the system, it is necessary to limit the types of resin used in curing systems so that the effect of various variables can be studied.

EXAMPLE 1

This example illustrates the effect of waiting time before exposure to microwave energy on final foam density, as measured volumetrically. The exposure was 30 seconds at 1,000 watt nominal power in the microwave oven, with 50 grams of material being used in each run at 75° F. The following recipe was used for the resin:

| Material | Grams |
|---|---|
| Aropol 7220 resin | 32.6 |
| Dion 6819 resin | 14.0 |
| Dow Corning 193 surfactant | 1.2 |
| Cobalt 12% promoter | 0.05 |
| Refrigerant 142B foaming agent | 1.8 |
| Lupersol Delta-X initiator | 0.33 or 0.5 |

With the 0.33 gram initiator, the gel time was 27 minutes (75° F.), and with 0.5 gram, the gel time was 18 minutes (75° F.). The batch viscosity at room temperature (75° F.) was approximately 1500 centipoise. As stated, material for each run was placed in the Litton microwave oven using the 1,000 watt (nominal) power setting for exactly 30 seconds. Upon exiting, the foam temperature, gel condition, and final foam height in a free rise cup were determined. The final foam density, in grams per cubic centimeter, are plotted against waiting time before microwave exposure, in fraction of gel time, in FIG. 1. From this figure, it is apparent that the final foam height is dependent to a slight extent upon waiting time before exposure to the microwave field and is also dependent to some degree upon absolute gel time. For the 27 minute gel time resin, the foam was gelled upon exiting the microwave field when the waiting time exceeded 0.15 gel time or 4 minutes. For the 18 minute gel time, gellation upon exit was not achieved until the waiting time exceeded 0.4 gel time or 7 minutes. These points are indicated by vertical arrows on the figure.

EXAMPLE 2

Using the recipe of Example 1, except that 0.25 gram of the methyl ethyl ketone peroxide initiator was used, a series of runs was made at various waiting times to determine the exit temperature from the oven following a 10 second exposure to the microwave field at 1000 watt (nominal) power setting. Runs were made at 0.025 gel time (substantially no waiting time), 0.500 gel time and 0.806 gel time. For this work, eight portions of resin were placed in the oven with consecutive ones being removed at five second intervals. The temperature above ambient temperature for each resin was measured at the exit of the microwave oven. These data are plotted in FIG. 2 for various times in the microwave oven. It will be noted that at 10 seconds in the microwave field a resin which is relatively fresh (0.025 gel time) increases in temperature only about 18° F. whereas a resin that is approaching 0.8 gel time has increased about 40° F. in temperature. This indicates that, as the structure develops, there is an effect upon the amount of energy absorption or, in other words, that the rate of heating increases with this increasing structure. Without a waiting time, the resin must heat to nearly 100° F. above ambient before it gels. It should be noted that there is no "knee" in the temperature curve for the 0.025 waiting time indicating that the resin temperature continues to increase toward peak exotherm conditions. On the other hand, resins that had 0.5 and 0.8 gel time waiting times only heat to 55° F. and 65° F. above ambient before they gel. The definite "knee" in the time-temperature curve for both materials indicates that above these times, the microwave energy is being used to enhance the peak exotherm conditions—an undesirable result.

EXAMPLE 3

Another series of runs was made to demonstrate the effect of waiting time on temperature of the resin exiting the microwave oven. The resin used was that of Example 1 containing 0.33 gram of the initiator, the one having the 27 minute gel time (75° F.). Exposure times of 20 seconds and 30 seconds to the microwave energy at the 1,000 watt (nominal) level are shown. Plotted in FIG. 3 is the foam temperature above ambient measured at the microwave exit against waiting time before exposure in fraction of gel time. There is an overshoot in the temperature curve at relatively low waiting times. The plateaus of temperature in the range of 0.2 to 0.4 gel times are important for gellation is seen to take place at the early times in this plateau and this is when foaming is taking place. For good results, the microwave exposure need only continue so long as to achieve the plateau temperature. Beyond the 0.4 gel time waiting time, the foam temperature increases, indicating that a larger portion of the energy is being used to heat the resin rather than to vaporize the foaming agent.

From the work reported above, it is apparent that the compounded resin should preferably be exposed to the microwave energy between 0.2 to 0.7 gel time and removed before 1 gel time. Waiting until after 0.7 gel time, when crosslinking is taking place at a rapid rate, reduces the time for evaporation of the foaming agent which results in higher density products.

The previous examples were used with specific resin recipes. Optimum foaming conditions may require some experimentation as variations are made in the recipe. Nevertheless, optimum processing conditions can be determined in accordance with the work reported above.

Based on the above work, additional work was done to develop applications for the products of this invention. The following example discloses the production of sand-filled foam products.

Coarse sand is generally considered to be sand which passes Sieve No. 8 (opening 2.38 mm) but is retained on Sieve No. 30 (opening 0.595 mm), medium sand is sand that passes Sieve No. 20 (0.841 mm) but is retained on Sieve No. 70 (0.210 mm), and fine sand is sand which passes Sieve No. 70 but is retained on Sieve No. 270 (0.053 mm).

EXAMPLE 4—Patio Block

Relatively large size (3 feet square by 3 inches thick, and larger) decorative concrete patio blocks for use in shopping plazas, motels, and the like are well known. This example illustrates a replacement material for such blocks. A coarse, unwashed sand-polyester resin gel coat was formulated according to the following recipe:

| Material | Grams |
| --- | --- |
| Dion 6819 Resin | 300 |
| Cobalt 12% Promoter | 0.6 |

-continued

| Material | Grams |
| --- | --- |
| Lupersol 112 Initiator | 2.25 |
| Coarse Sand | 500 |

With the exception of the sand, this recipe was mixed for about 60 seconds, the sand added, and 60 seconds additional mixing were provided. The reacting mixture was poured into a 10 inch by 12½ inch polypropylene pan where gelling was allowed to take place while the foamable resin was prepared. A foamable substrate was made using the following recipe:

| Material | Grams |
| --- | --- |
| Aropol 7220 Resin | 279 |
| Dion 6819 Resin | 186 |
| Dow Corning 193 Surfactant | 20.1 |
| Cobalt 12% Promoter | 1.5 |
| Refrigerant 142B Foaming Agent | 22.8 |
| Lupersol Delta-X Initiator | 3.0 |
| Lupersol 112 Initiator | 2.0 |
| Sakrete Sand Mix (Fine sand) | 1,000 |
| Englehardt ASP Clay | 125 |

The resin mixture had a gel time of 6 minutes (72° F.). With the exception of the sand and clay, the recipe was mixed for about 60 seconds. The sand and clay were then added and mixed for an additional 60 seconds and then poured onto the partially gelled gel coat in the polypropylene pan.

Three minutes after adding catalyst to the foamable resin blend, the pan was placed in the Litton microwave oven at full power (2000 watts nominal) for 45 seconds. The foamable layer foamed to about 1½ inches and was substantially gelled on exit from the field. The exit temperature was approximately 142° F. with a peak exotherm temperature of 248° F. being reached 10 minutes after adding catalyst to the resin blend.

The final product had a smooth ⅛ inch integral gel coat with a sand grain appearance. The foam density was 36.6 pounds per cubic foot and the overall density was 58 pounds per cubic foot.

The product could be used as a patio block and is superior, because of light weight and weatherability, to concrete blocks now in use. Such concrete blocks have a typical density of 200–250 pounds per cubic foot resulting in high shipping and labor costs during installation.

The gel coat layer for the blocks using the unsaturated polyester foam can include sand, marble dust, pigments, ultraviolet stabilizers, colored aggregate, glass beads or mat, chopped glass, wood, etc. Obviously, various thicknesses of outer gel coat and foam layer can be provided to suit various applications.

EXAMPLE 5—Roofing Panel

This example demonstrates the production of roofing panels suitable for replacement of present light weight weather-resistant insulated roofing panels for applications in large spans such as roofs for airplane hangars, warehouse roofs, etc.

The production of a roofing panel was made in a 10 inch by 12 inch by 3 inch deep hardwood side box having a 5° draft per side. The bottom of the box was ¼ inch glass plate. All wood surfaces were sealed with RAM 96-X1 sealer and two coats of RAM Hi-Lite Mold Wax 60-X3. These are commercially available products of Ram Chemicals Corp., Gardena, CA. After drying the mold was ready for use and coated with two coats of mold release.

A gel coat layer was prepared using the following recipe:

| Material | Grams |
| --- | --- |
| Dion 6819 Resin | 150 |
| Cobalt 12% Promoter | 0.3 |
| Lupersol 112 Initiator | 1.4 |
| Coarse Sand | 300 |

This batch was mixed for 60 seconds and poured into the mold where gelling was allowed to take place while the foamable resin was prepared. The foamable resin was made according to the following recipe:

| Material | Grams |
| --- | --- |
| Dion 6805 Resin | 312 |
| Dion 6819 Resin | 204 |
| Additional Styrene | 84 |
| Aropol 7220 Resin | 150 |
| Cobalt 12% Promoter | 3.0 |
| Dow Corning 193 Surfactant | 30 |
| Refrigerant 142B Foaming Agent | 61 |
| Lupersol 112 Initiator | 7.4 |
| Micro-Mix 133 | 750 |

Micro-Mix 133 is a commercially available product of Micro-Materials, Inc., Sugar Grove, IL, and is a reinforcing filler containing, on a weight basis, 90% silica flour, 5% mica flakes, 2.5% glass spheres, and 2.5% titanium dioxide. The complete recipe was mixed for 30 seconds and then poured onto the gel coat layer previously poured into the mold. The resin had a 12 minute gel time (72° F.) and 9 minutes after adding catalyst, the mold was placed in the full power (2000 watts nominal) microwave field for 55 seconds. The foam extended to about ½ inch above the mold rim and was gelled. A sheet of polycarbonate coated with Pop-Out, a commercially available mold release product of Venus Products, Kent, WA, was clamped to the top of the mold. After 15 minutes, the polycarbonate sheet was removed and cure completed in a 200° F. convection oven for 45 minutes. The overall panel density (bulk weight) was approximately 17 pounds per cubic foot with the foam having a density of 13 pounds per cubic foot.

The gel coat described above can include fillers such as sand, aggregate, glass beads, etc. It can have a textured or embossed decoration. It can include metallic flake or other reflective surfaces for solar reflection. Other reinforcing materials such as woven, non-woven or chopped glass mat, welded or woven wire and so on can be used. Gel coat thicknesses should preferably be ⅛ inch, but they can be as thick as 1 inch. Such variation, of course, depends upon the loading conditions, reinforcement requirements, and design criteria.

Additional reinforcement can be used between the gel coat layer and the foam resin layer. The foam layer can also contain fillers such as sand, glass spheres, fly ash, etc., as well as reinforcing fibers such as chopped glass, mica, asbestos, etc. Fire retardants and pigments can also be used.

The fabrication method can be modified to provide methods for securing the roofing panels to the substrate. Furthermore, tongue and groove, lap joint, or other waterproof edges can be formed during the production process.

EXAMPLE 6—Profile Shapes

This example discloses a process for making various profile shapes such as L-shaped sections. Such shapes are frequently desired in building construction. As a mold for the production of the panel of this example, a hinged glass plate mold, joined with glass tape, was prepared. The edges at the outer ends of the mold were supplied with cork and rubber gasketing material.

A foamable resin mixture was compounded according to the following recipe:

| Material | Grams |
| --- | --- |
| Aropol 7220 Resin | 194 |
| Dion 6819 Resin | 83 |
| Dow Corning 193 Surfactant | 4.6 |
| Cobalt 12% Promoter | 0.3 |
| Refrigerant 142B Foaming Agent | 18.2 |
| Lupersol Delta-X Initiator | 3.0 |
| Fire Retardant (MM-FX 500 Supplied by Micro-Materials) | 300 |

MM-FX 500 is a proprietary mixture of hydrated metallic salts and fillers. The above mixture was mixed for 60 seconds and poured onto the hinged, but still horizontal, glass surface. Nine minutes after adding initiator, the material was exposed to full microwave power (2000 watts nominal) in the Litton 70/80 microwave oven for 30 seconds. The foam level rose about ½ inch above the 1 inch thick gasket edges and was gelling as it exited the oven. Upon removal from the oven, the second hinged glass plate was forced into the foamed surface and the mold immediately bent into a 90° angle. The mold was then held in that shape until the resin cured. Approximately 2 hours after forming, the mold was removed and the foamed part retained the mold shape. The final part density was 18.8 pounds per cubic foot and was uniform throughout.

A similar procedure was also used to produce a material having an integral gel coat.

Further, this system can be used to produce other shaped articles such as U-shaped channels. The products provide both thermal and sound insulation.

EXAMPLE 7—In-Mold Forming

The example illustrates a method for forming three dimensional shapes with unsaturated polyester foam. In the run reported herein, a 90° corner was formed by using glass plates as mold surfaces and cork and rubber gasketing material to keep the plates separated. The following mixture was prepared:

| Material | Grams |
| --- | --- |
| Aropol 7220 Resin | 162 |
| Dion 6819 Resin | 69 |
| Dow Corning 193 Surfactant | 3.8 |
| Cobalt 12% Promoter | 0.25 |
| Refrigerant 142B Foaming Agent | 15.2 |
| Lupersol Delta-X Initiator | 2.5 |
| MM-FX 500 Fire Retardant | 250 |

The mold was held in a cradle at a 45° angle and the resin poured into it after which the top plate was placed and secured in position. After 9.25 minutes waiting time, the assembly was placed in the Litton microwave oven and exposed to full power (2000 watts nominal)

for 45 seconds. The foam filled the mold and was gelled upon exiting the oven. It was allowed to exotherm and cure at room temperature. The resulting foam had a density of 18.6 pounds per cubic foot and good cell structure.

A repetition of this run substituting aluminum hydroxide for the MM-FX 500 produced a cellular article with a density of about 12.5 pounds per cubic foot.

EXAMPLE 8—In-Mold Foaming

In this run, a polyester casting resin was used to fabricate a mold. A 6 ounce polyethylene terephthalate mouthwash bottle was used as the pattern. The volume was approximately 210 milliliters. After being certain that the polyester casting resin was fully cured by heating the mold in a convection oven with a final cure of 72 hours at 300° F., the mold was cut lengthwise through the parting line in the bottle. The polyethylene terephthalic bottle was discarded and the mold surface treated with mold release agent. Silicone stop-cock grease was used between the two halves as a liquid seal and the mold was held together with adjustable hose clamps. A gel coat resin was prepared according to the following recipe:

| Material | |
|---|---|
| Dion 6819 Resin | 50 grams |
| Cobalt 12% Promoter | 0.075 gram |
| Lupersol 112 Initiator | 0.5 grams |

The gel coat was poured into the mold and the mold rotated manually to achieve a uniform coating on the inner surface after which the excess was poured from the mold. While the gel coat was gelling, the foamable mixture was prepared with the following recipe:

| Material | Grams |
|---|---|
| Aropol 7220 Resin | 34 |
| Dion 6819 Resin | 14.5 |
| Dow Corning 193 Surfactant | 1.2 |
| Cobalt 12% Promotor | 0.05 |
| Refrigerant 142B Foaming Agent | 2.5 |
| Aluminum Hydroxide | 25 |
| Lupersol Delta-X Initiator | 0.5 |

The foamable mixture, having a gel time of 6 minutes (72° F.), was mixed and dispensed into the top of the mold at a resin temperature of 72° F. After waiting 2 minutes, it was exposed to the half power (1,000 watts nominal) microwave field for 60 seconds, the foam being substantially gelled upon exit. Thereafter, the mold was placed on a convection oven and heated for 15 minutes at 200° F. following the microwave exposure. Upon cooling, removal of the part was not difficult. One part so produced weighed 45.7 grams for a bulk part density of 14.1 pounds per cubic foot. The gel coat weighed about 15 grams indicating a foam core density of about 9.6 pounds per cubic foot.

A number of modifications can be made in the in-mold forming shown in the previous two examples. One involves substitution of the mold compositions in place of the glass and polyester casting resin shown. Suitable materials include Teflon, polypropylene, wood, plaster, fiberglass reinforced polyester, epoxy, phenolics, and melamine resins. Polystyrene and polycarbonate, although microwave transparent, are not satisfactory since they are attacked by the styrene in the unsaturated polyester resins.

The molds used in the type of operation disclosed in the previous two examples should be designed so that little pressure is generated by the foaming resins. Preferably, vents are used in a top-most portion of the mold to allow the air and excess foaming agent to escape ahead of the rising foam without substantial pressure buildup. The maximum pressure expected during normal foaming in a closed mold is approximately 10 pounds per square inch and 15 pounds per square inch would be considered excessive.

The vents should be small enough to allow gas to escape but to inhibit liquid escape. Vents should, obviously, be placed in a manner that minimizes trapping of large pockets of air.

The following two examples show methods for forming continuous laminated architectural panels, such panels having a weather resistant exterior surface, an unsaturated polyester foam core, and a decorative or fire retardant interior surface. In low-rise commercial structures, one construction method is to provide a truss work of riveted or welded steel at the site. Onto this structure are hung the wall panels. Such panels have been composites of exterior materials of cementious or organic nature, an insulative foam core, and interior layers of drywall panelling or other decorative materials.

EXAMPLE 9—Decorative Architectural Panel

In this run, the mold used in Example 5 was used with the same pretreatment and coating described therein.

A quantity of 830 grams of 2 inch diameter stones were washed and thoroughly dried. These were randomly placed upon the glass bottom of the mold and a gel coat having the recipe shown below was poured over and around the stones and allowed to gel. The recipe was:

| Material | Grams |
|---|---|
| Dion 6819 Resin | 300 |
| Cobalt 12% Promoter | 0.6 |
| Lupersol 112 Initiator | 2.8 |
| Dry Coarse Sand | 130 |

The following foamable resin recipe was prepared and poured into the mold on the surface of the gel coat:

| Material | Grams |
|---|---|
| Aropol 7220 Resin | 972 |
| Dion 6819 Polyester Resin | 417 |
| Dow Corning 913 Surfactant | 34.7 |
| Cobalt 12% Promoter | 1.4 |
| Refrigerant 142B Foaming Agent | 75 |
| Lupersol Delta-X Initiator | 10 |
| Lupersol 112 Initiator | 5.0 |

This resin recipe has a gel time of about 18 minutes (72° F.). The ingredients were mixed for approximately 60 seconds. After 12 minutes of waiting time after adding the initiator, the mold containing the stones, the gel coat and foamable resin mixture was placed in the Litton 70/80 microwave oven and exposed to 2,000 watts (nominal) for 60 seconds. The foam rose to approximately 4 inches (about 1 inch above the height of the mold) and was gelled upon exiting the oven. Thereafter, the ⅜ inch thick sheet of polycarbonate with no pretreatment, was pressed onto the surface of the fresh foam, pressing it uniformly to the 3 inch thickness of the mold wall. The natural solvent attack of the styrene in the polyester fused the polyester to the polycarbonate. In approximately 15 minutes, the foam exothermed to about 385° F. A 9¼ inch by 10⅞ inch by 4 inch thick sample was cut from the molded piece. With the interior surface decorated with metallic foil, the sample appeared to be an integral wall panel with good foam cells and overall integrity with the decorative stones on the outer surface thereof. The foam density in the final product was 15 pounds per cubic foot.

EXAMPLE 10—Fire Retardant Architectural Panel

Using the mold used in the previous example, a textured fire retardant exterior surface was obtained in the product produced by this example. After mold surface preparation, aluminum hydroxide powder was poured over the bottom of the mold to a depth of approximately 3/16 inch. Into this powder was pressed colored aquarium stones of a nominal ¼ inch diameter so that about half the height of the stones was exposed above the powder. The following gel coat recipe was prepared and poured over the aluminum hydroxide and stones and allowed to gel:

| Material | Grams |
|---|---|
| Dion 6819 | 400 |
| Cobalt 12% Promoter | 0.5 |
| Lupersol 112 Initiator | 4.0 |
| Aluminum Hydroxide Reagent Grade | 500 |
| Titanium Dioxide Pigment | 4.0 |

While the gel coat was gelling, the foamable resin recipe as follows was prepared:

| Material | Grams |
|---|---|
| Aropol 7220 Resin | 324 |
| Dion 6819 Resin | 139 |
| Dow Corning 193 Surfactant | 11.6 |
| Cobalt 12% Promoter | 0.5 |
| Refrigerant 142B Foaming Agent | 25 |
| Lupersol Delta-X Initiator | 5.0 |
| Aluminum Hydroxide Reagent Grade | 625 |

The gel time for this recipe was approximately 14 minutes (72° F.). This mixture was mixed for approximately 60 seconds and poured onto the gel coat in the mold. Nine minutes from the time the initiator was added, the mold and resin mixture was placed in the Litton 70/80 microwave oven and exposed to 2,000 watts (nominal) microwave power for 60 seconds. The foam rose approximately 2 inches and was gelled on exiting the microwave oven. A panel was cut from the molded part and the excess aluminum hydroxide washed from the gel coat leaving the aquarium stones partly imbedded in the gel coat, providing an attractive wall panel. The fire retardant foam density was 15 pounds per cubic foot and the overall panel density was 38.7 pounds per cubic foot. A conventional ½ inch gypsum board drywall was glued to the free surface of the foam panel with Goodyear Pliobond 2030 paneling adhesive without additional surface preparation, thus providing an overall wall thickness of approximately 2¾ inches.

APPARATUS

Obviously, the work reported in this disclosure was carried out by a batch process. However, FIG. 5 illustrates apparatus for using one embodiment of the invention for the production of laminated panels. In this drawing, there are shown a reservoir 10 and a catalyst reservoir 12. These feed two feed containers, respectively, 14 and 16 through lines 18 and 20, respectively. Reservoir 10 contains the one or more unsaturated polyester resins with all the compounding ingredients therein, except for the initiator. The initiator is supplied from reservoir 12. Through conduits 22 and 24, these two items are fed to a mixer to mix the resin and the initiator. This mixer is shown as 26, driven by drive means 28.

In view of the fact that the initiator may be used in comparatively small amounts, roughly one part by weight per 100 parts of the compounded unsaturated polyester resin and that the initiator may be of low viscosity and the resin may be of high viscosity, special care is needed to achieve uniform mixing. This area of concern is well known to those skilled in the art. One piece of apparatus presently employed with the production of polyester casting resins is the Hydrojector made by Venus Products, Kent, Wash. Another mixing device which has been used satisfactorily in certain instances is the Multi-flow positive displacement pump made by Liquid Control Corporation, Wickliffe, Ohio.

Following mixing, the resin is fed to a nip pool 30 maintained in the nip between main roll 32 and nip roll 34. In some installations, it may be necessary to provide a holding zone between mixer 26 and supply to nip pool 30 because, as previously pointed out, the material should not be exposed to radiation until a certain proportion of the gel time has elapsed. Passing around main roll 32 is a carrier belt 36 which is guided by, in addition to roll 32, rolls 36, 38, and 40. One or more of these rolls can be driven. After passing between the nip between rolls 32 and 34, the resin mixture passes along a path 42 into the microwave foaming unit 44. Large microwave ovens are commercially available and have been used for many years for curing rubber and polyurethane foams. One manufacturer of such equipment is Gerling-Moore, Palo Alto, California.

Obviously, the equipment downstream of the microwave oven 44 will depend to a great degree upon the type of product being produced. Shown in FIG. 4, is the system suitable for the production of laminated foam. The laminate may be the same or different on each side and may be any material desired for surfacing of the foam. One such machine which operates in a continuous manner for laminating aluminum foil to polyurethane foam is made by Kornylak, Hamilton, Ohio. This machine uses a series of moving platens and can be used for the application of gypsum board or plywood to the foam. The apparatus downstream of the panel laminator 46 would be conventional in dealing with these products. Schematically shown are a panel saw 48 and a panel stacker showing a series of panels 50.

The number of items of optional equipment are also shown in FIG. 5. These include a glass chopper system 52 adapted to supply chopped fiber to the moving belt prior to contact with the nip pool, this being suitable to provide a chopped glass layer in the outer surface of the foam. Such glass choppers have been used for many years in the "spray-up" process of producing reinforced fiber glass products. Also shown is a system for providing a top glass layer such as C-veil to the foam structure. This includes a glass supply source 54 and a guide roller 56. The glass 58 flows from the source 54 around guide roller 56 and into the nip onto the upper surface of the foam product.

Obviously, many variations can be made coming within the broad scope of the invention disclosed herein. Such modifications will be apparent to those skilled in the art.

What is claimed is:

1. A process for the production of foamed products from and unsaturated polyester resin composition, said composition comprising flexible or semi-rigid polyester resin, unsaturated monomer, a promoter, a peroxide initiator, physical blowing agent, and compatible surfactant whereby a known gel time "T" results, foaming said composition by exposing it to microwave radiation having a frequency of at least 640 MHz prior to 1 T, thereafter permitting said foam structure to exotherm to obtain a fully cured product, said foaming taking place at or slightly prior to 1 T.

2. The process of claim 1 wherein the resin composition is initially exposed to the radiation between 0.2 and 0.7 T.

3. A process for the production of formed products from an unsaturated polyester resin composition, and composition comprising a mixture of rigid and flexible polyester resin, styrene, promoter, and compatible surfactant and having upon subsequent addition of an initiator a gel time of "T", said process comprising adding a peroxide initiator and a physical blowing agent to the composition, exposing said composition to microwave radiation having a frequency of at least 640 MHz at a time greater than 0.2 T and less than 1 T whereby foaming takes place at or slightly prior to gellation, discontinuing said exposure after 1 T, thereafter permitting said foam structure to exotherm to obtain a fully cured product.

4. The process of claim 3 wherein the resin composition is initially exposed to the radiation between 0.2 and 0.7 T.

5. The process of claim 1 wherein the time of exposure to microwave radiation is 10 to 60 seconds.

* * * * *